UNITED STATES PATENT OFFICE.

ADOLF VOIGT, OF HAMM-ON-THE-SIEG, GERMANY.

PROCESS OF NITRATING CELLULOSE.

No. 855,889.  Specification of Letters Patent.  Patented June 4, 1907.

Original application filed March 28, 1904, Serial No. 200,348. Divided and this application filed September 24, 1906. Serial No. 335,978.

*To all whom it may concern:*

Be it known that I, ADOLF VOIGT, a subject of the King of Prussia, German Emperor, and a resident of the city of Hamm-on-the-Sieg, Province of the Rhine, German Empire, have invented a new and useful Process of Nitrating Cellulose, of which the following is an exact specification.

The process hereinafter described forms a division of my prior application numbered 200,348 and filed March 28, 1904.

My invention relates to a new and improved process of manufacturing nitrated cellulose and has for its purpose to provide for an improved process, by means of which a higher nitrated product is obtained, than by the before mentioned original process, from which the present process forms a division.

For manufacturing nitrated cellulose, such for instance as gun-cotton or collodion-wool, the following process has hitherto been used. The scoured and dried cotton fibers are brought into a mixture of nitric acid and sulfuric acid. Thereafter the product is freed from the acid by means of a long and complicated boiling-, washing- and grinding-process. The so obtained nitro-cellulose has the structure of the rough fiber and must still be subjected to a diluting and gelatinizing process, in order to make the nitro-cellulose fit for the manufacture of a blasting material.

It has been tried to simplify the nitrating and pulverizing process, for instance by combining both processes, so as to be carried out by one operation, or by effecting the pulverization before the nitrifying process. The latter trials have been made for the purpose of obtaining a highly nitrated product of a uniform composition. According to another process the cellulose has been dissolved in suitable liquids, then it has been decanted, washed and dried, whereupon the so-obtained powdered mass has been nitrated. In addition to being very complicated and expensive this process has the disadvantage, that a powdered material is very hard to nitrate and afterward to wash out, and the stability of the nitro-products so obtained is usually unsatisfactory in practice.

The beforementioned defects are perfectly overcome by the process forming the subject of the present invention, and a particularly highly nitrated product is got thereby.

The process is carried out into effect as follows:—The scoured and cleaned cotton or cellulose is brought into a mixture of concentrated sulfuric acid having a temperature of about 2 or 3 degrees centigrade, and of a small quantity of concentrated nitric acid. Of course the quantity of nitric acid added to the sulfuric acid must be so small, that the capability of the sulfuric acid of dissolving the fibers is not materially diminished. An addition of from 2 to 3 per cent of nitric acid will be quite sufficient for obtaining a good result. In this mixture the cotton can be just as well dissolved as in pure sulfuric acid. Thereafter the material is stirred up until it forms a pulpy mass. It has proved advantageous to use about 1 kg of cellulose for 5 kg of concentrated sulfuric acid, however these proportions can be varied according to the special circumstances of the work. The disintegration of the fibers takes place very rapidly with a simultaneous increasing of the temperature. Therefore it is preferable to provide for a cooling of the material. After the structure of the fibers has been destroyed a certain quantity of nitric acid in a concentrated state is added to the pulpy mass, thereby converting the pulpy nitro-product into hard balls or lumps. Also during the latter operation the material may preferably be cooled. After about 2 or 3 hours the mass is congealed and forms a solid cake, which is washed out in great quantities of water, advantageously in a filtering press.

The obtained product after drying has the form of a very fine powder of a great stability. It does not explode by shocks or friction or by the blow of a hammer, even when upon an iron plate. When ignited it burns slowly. It can be exposed for more than one hour to a temperature of 135 degrees centigrade without igniting. The material has proved very advantageous for the manufacture of shooting and blasting powders, of varnishes and the like.

Having thus fully described the nature of my invention, what I desire to secure by Letters Patent of the United States is:—

1. Process of nitrating cellulose, consisting in treating cellulose fibers with a mixture of concentrated sulfuric acid and of nitric acid, the latter amounting to about 3 per cent in weight of the sulfuric acid, leaving the cellulose fibers in this mixture till the disintegration of the fibers has taken place, so as to form a pulpy mass, in introducing this mass into concentrated nitric acid for its nitrification and rendering it solid, and then in washing the solid mass in water.

2. Process of nitrating cellulose, consisting in treating cellulose fibers with a mixture of concentrated sulfuric acid and of nitric acid, the latter amounting to about 3 per cent in weight of the sulfuric acid and the temperature of the mixture being about 2 to 3 degrees centigrade, leaving the cellulose fibers in this mixture till the disintegration of the fibers has taken place, and introducing the whole in concentrated nitric acid for its nitrification and rendering it solid, and then washing the mass in water.

In witness whereof I have hereunto set my hand in the presence of two witnesses.

ADOLF VOIGT.

Witnesses:
BESSIE F. DUNLAP,
LOUIS VANDORN.